I. E. SEXTON.
RIVETING MACHINE.
APPLICATION FILED JAN. 30, 1919.
1,328,905.
Patented Jan. 27, 1920.
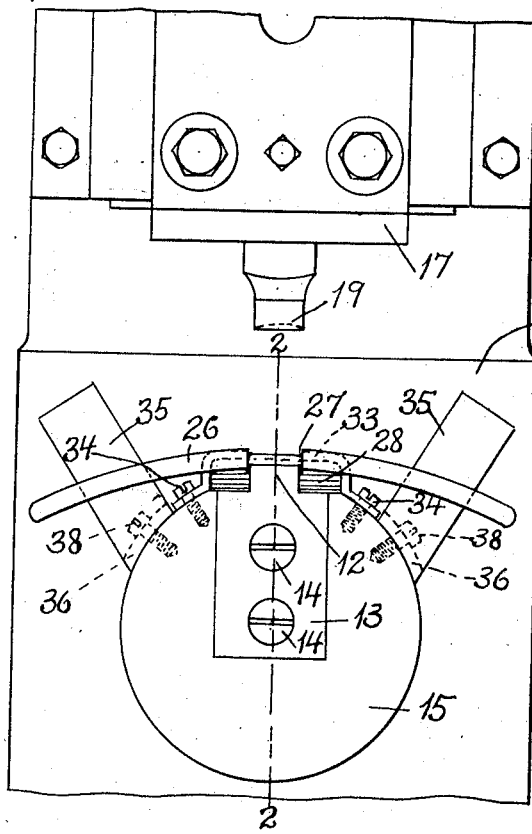
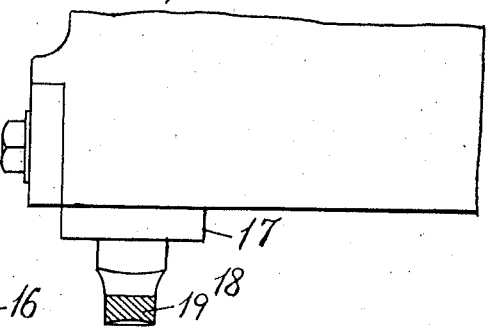
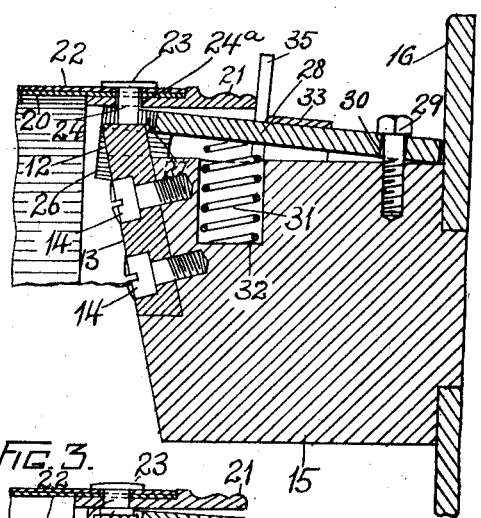
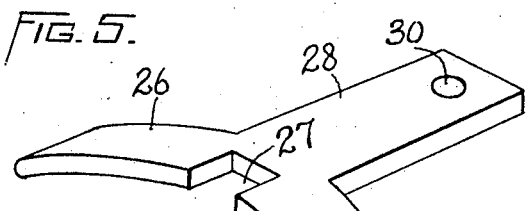
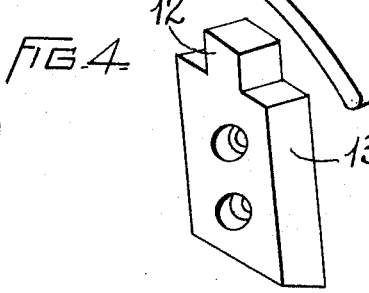
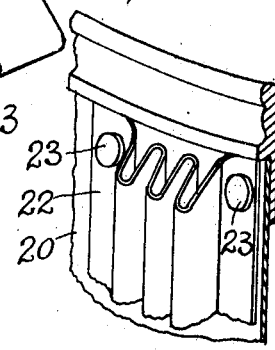
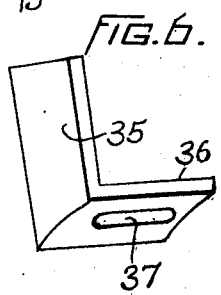
INVENTOR:
J. E. Sexton
by Wright Brown Quinby May
ATT'YS.

UNITED STATES PATENT OFFICE.

ISAAC E. SEXTON, OF BOSTON, MASSACHUSETTS.

RIVETING-MACHINE.

1,328,905.　　　Specification of Letters Patent.　　Patented Jan. 27, 1920.

Application filed January 30, 1919. Serial No. 274,032.

*To all whom it may concern:*

Be it known that I, ISAAC E. SEXTON, a citizen of the United States, residing at Boston, in the county of Suffolk and State of Massachusetts, have invented new and useful Improvements in Riveting-Machines, of which the following is a specification.

This invention has for its object to provide a machine adapted to fasten together by rivets a plurality of layers of material, the layers being, for example, the cylindrical sheet metal body of an ash can, or other receptacle, a ring forming one end of the receptacle and in contact with the inner surface of the body, and a sheet metal reinforcing strip extending lengthwise of the receptacle, and in contact with the outer surface of the body, the machine being adapted to form on the inner ends of previously headed rivet shanks, enlargements constituting inner heads bearing on the inner surface of the reinforcing ring.

The invention is embodied in the improvements which I will now proceed to describe and claim.

Of the accompanying drawings forming a part of this specification,—

Figure 1 is a front elevation of a portion of a riveting machine embodying the invention.

Fig. 2 is a side elevation of the same, and a section on line 2—2 of Fig. 1.

Fig. 3 is a view similar to a portion of Fig. 2, illustrating the operation of enlarging the inner end of a rivet shank to form an inner head thereon.

Fig. 4 is a perspective view of the anvil detached from the mandrel hereinafter described.

Fig. 5 is a perspective view of the work rest.

Fig. 6 is a perspective view of one of the members of the adjustable gage.

Fig. 7 is a fragmentary perspective view, showing a portion of the cylindrical body, a portion of a ring forming one end of the receptacle, and a portion of one of the longitudinal reinforcing strips riveted to the body and ring.

The same reference characters indicate the same parts in all of the figures.

In the drawings, 12 represents a fixed upwardly facing anvil, preferably formed as shown by Fig. 4, on a shank or plate 13 which is attached as by screws 14 to an anvil support 15, the support being preferably a mandrel attached to and projecting from one side of a supporting frame 16. The acting face of the anvil preferably projects above the body of the mandrel.

The machine is provided with a reciprocating head 17 overhanging the anvil and separated therefrom by a throat 18. To the head is attached a ram 19 which is movable by the head in a fixed path toward and from the anvil, suitable means, not shown, being employed for reciprocating the head and ram. The ram has an unobstructed end face formed to bear on a rivet head, as hereinafter described.

It is customary in riveting machines to provide head-reciprocating mechanism organized to stop automatically after each depression and elevation of the head, the head being automatically arrested in a raised position, and this reciprocating mechanism being again started by the operator. Operating mechanism of this character being well known, I do not illustrate the same in the drawings.

Fig. 7 illustrates a portion of an annular article, such as an ash barrel including a sheet metal body 20, a relatively thick ring 21, preferably formed by bending a metal strip into the form of a hoop, the ring having a portion which is seated on the inner surface of the body 20, and a corrugated sheet metal reinforcing strip 22 extending lengthwise of the receptacle and having ears which are seated on the outer surface of the body 20, and are secured thereto by rivets, formed as shown by Fig. 2. Each rivet includes a relatively large previously formed head 23, and a shank 24 integral with the head, and formed to pass through coinciding orifices 24ᵃ formed in the body 20, ring 21, and reinforcing strip 22, the diameter of said orifices being greater than that of the shank, so that when the receptacle is held in a substantially horizontal position, a rivet shank may be dropped freely into the orifices.

In the completed receptacle the inner end of each rivet shank is upset to form a relatively small inner head 25 (Fig. 3) seated on the inner surface of the ring 21, as shown by Fig. 3.

26 represents a movable work rest, supported with its outer face above the anvil 12, the rest being adapted to bear on the inner surface of the ring 21 and normally support the ring spaced from the anvil face, as shown by Fig. 2, so that the rivet shank may be seated on the anvil and upset by pressure imparted by the ram 19 to form the inner head 25, the shank 24 being shortened by this operation, and its diameter being increased to completely fill the orifices 24ª. During this operation the rest yields to compensate for the shortening of the shank, so that when the inner head 25 is completed, the layers 20, 21 and 22 are securely clamped together, the head 23 being in binding contact with the layer 22 and the enlargement or inner head 25 in binding contact with the ring 21.

The rest 26 is preferably provided with a recess 27 which is formed to receive the anvil and form opposite sides of a rivet-shank-receiving space above the anvil, said recess being open at the outer edge or end of the rest.

The work rest is provided with a shank portion 28 loosely connected with the support or mandrel 15, preferably by means of a headed stud 29 inserted in the arm and passing loosely through an orifice 30 in the shank portion 28, the arrangement being such that the work rest is adapted to swing or oscillate vertically on the stud 29.

The work rest is yieldingly supported with its outer face above the anvil, by a spring 31 seated on the bottom of a cavity 32 formed in the mandrel 15, and exerting upward pressure on the shank portion 28. The upward movement of the work rest is limited by a stop 33 extending across the shank portion and having offset ends which are secured as by screws 34 (Fig. 1) to the mandrel 15.

The mandrel is provided with adjustable gage means, preferably embodied in two gage members 35, each having a shank 36 formed to be seated on the periphery of the mandrel 15, and provided with a slot 37 receiving attaching screws 38, the arrangement being such that each gage member 35 is adjustable lengthwise of the mandrel and adapted to be positioned to arrest the outer edge of the ring 21 when the rivet holes and the rivet therein are in position over the anvil. It is obvious that the gage means may be embodied in one member 35, instead of two members, as here shown.

The support or mandrel 15, the anvil, and the work rest, are formed to occupy a portion of the interior of an annular article such as an ash barrel, and to permit a partial rotation of the article after the completion of each rivet, to bring the holes for the next rivet over the anvil, without removing the article from the mandrel.

The operation is as follows:

The body 20, the ring 21, and the reinforcing strip 22, being assembled and suitably secured together with their rivet holes 24ª registering with each other, the operator places the ring on the work rest and drops a rivet shank into the rivet holes. The ram 19 is then caused to descend and exert pressure on the rivet head 23, thus forcing the inner end of the shank 24 against the anvil face and causing the formation of the inner head 25, and the described enlargement of the diameter of the shank, the rest 26 yielding to compensate for the shortening of the shank resulting from the enlargement of its diameter and the formation of the inner head. The acting end face of the ram 19 has an area equal to that of the rivet head 23 and is preferably concave and adapted to impart a convex form to the rivet head, so that the margin of the inner face of said head is pressed closely against the strip 22.

It will be seen that the described machine enables the parts 20, 21, and 22 to be quickly and securely connected by rivets having relatively large, previously formed outer heads 23, and smaller heads 25 formed by the operation of the machine, the outer heads being adapted by reason of their relatively large size, to withstand rough usage to which the receptacle is liable to be subjected. The inner heads 25, although relatively small, are adapted to perform their function without being supplemented or enlarged by separately formed and applied washers or burs, because they are within the receptacle and are, therefore, protected by the ring 21 against rough usage.

The spring 31 and the stop 33 constitute elements of means whereby the work rest is normally held yieldingly in position to space the outer face of the annular article from the anvil face a distance substantially equal to the total length of a rivet 23, with the rivet head in contact with the outer surface of the article and the rivet shank in contact with the anvil face, as shown by Fig. 2. It will be seen, therefore, that the unobstructed end face of the ram, in moving toward the anvil face, acts through the rivet head to force the rivet-containing portion of the article toward the anvil-face, and at the same time to upset the rivet shank to form the inner head 25 upon the inner surface of the article, as shown by Fig. 3, the inner surface of the article being moved toward the anvil face while the inner head is being formed, so that a single movement of the ram toward the anvil face is sufficient.

I claim:

1. A riveting machine for upsetting the shank of a previously headed rivet inserted in an annular article, the rivet head bearing on the convex outer surface and the shank projecting from the concave inner surface of the article, said machine comprising a mandrel having an anvil face, said mandrel and face being formed to occupy a portion of the interior of the annular article, a ram movable in a predetermined path toward and from the anvil face, and having an unobstructed end face, a work rest movable toward and from the anvil face and formed to bear on the inner surface of the article, and to permit the interposition of the rivet between the anvil face and the ram, and means whereby the work rest is normally held yieldingly in position to space the outer face of the article from the anvil face a distance substantially equal to the total length of the rivet, with the rivet head and the rivet shank bearing respectively on the outer surface of the article and on the anvil face, so that the ram in moving toward the anvil face, acts through the rivet head to force the rivet-containing portion of the article toward the anvil face, and at the same time to upset the rivet shank upon the inner surface of the article.

2. A riveting machine having an anvil face raised above the body of the mandrel, a movable work rest joined at one end to the mandrel to swing thereon, said work rest and mandrel being formed to occupy a portion of the interior of an annular article, a rest-raising spring interposed between the mandrel and the work rest and located between the jointed and swinging ends of the work rest, a stop limiting the elevation of the work rest by the spring, and a ram adapted to coöperate with the anvil face in upsetting a rivet shank on the inner face of said article.

3. A riveting machine comprising a mandrel having an anvil face, a movable work rest supported by the mandrel, the work rest and mandrel being formed to occupy a portion of the interior of an annular article, means normally supporting the work rest above the anvil face and permitting the rest to yield toward said face, a work gage on the mandrel adapted to position the article on the work rest, and a ram adapted to coöperate with the anvil face in upsetting a rivet shank on the inner side of said article.

In testimony whereof I have affixed my signature.

ISAAC E. SEXTON.